United States Patent Office 3,419,117
Patented Dec. 31, 1968

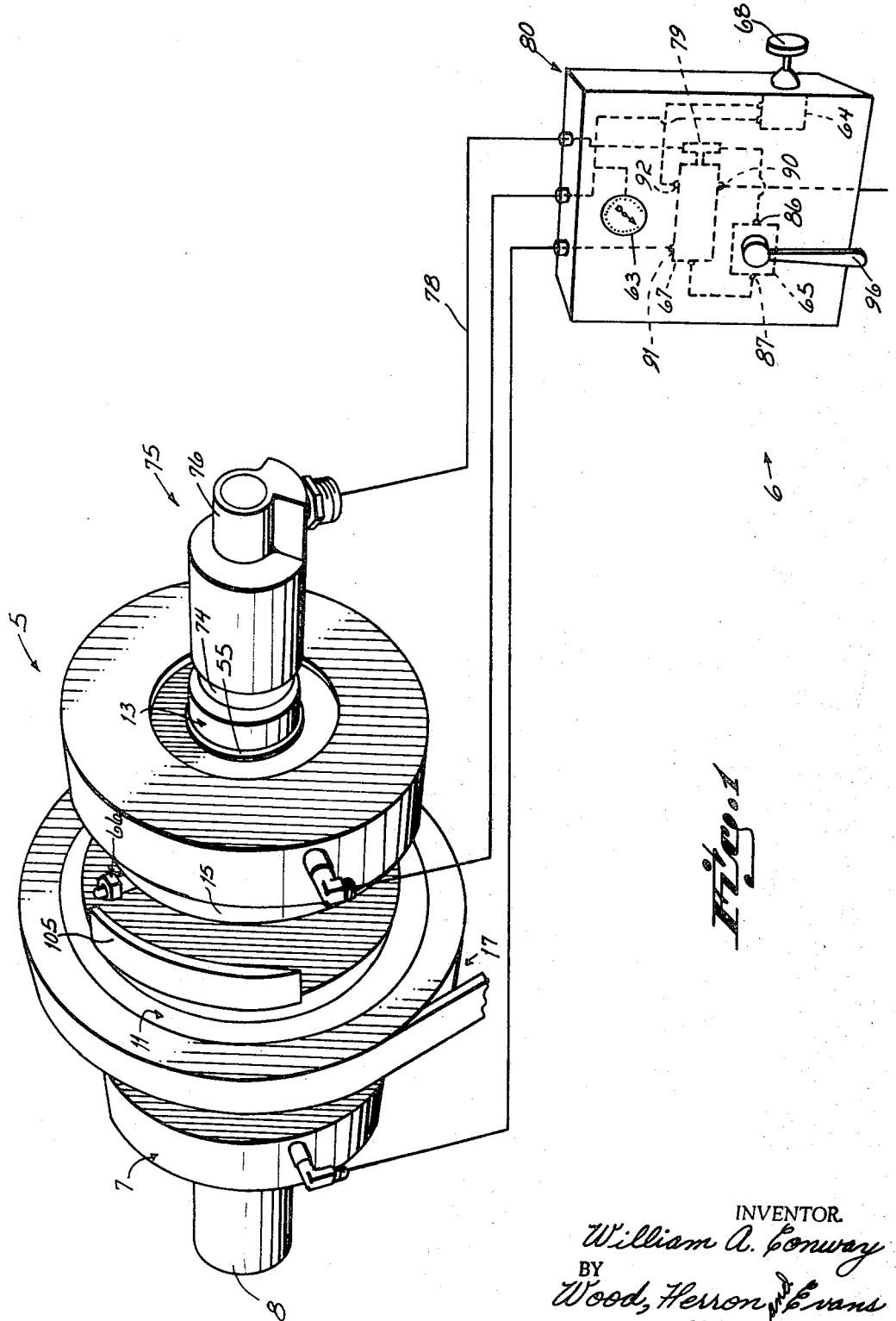

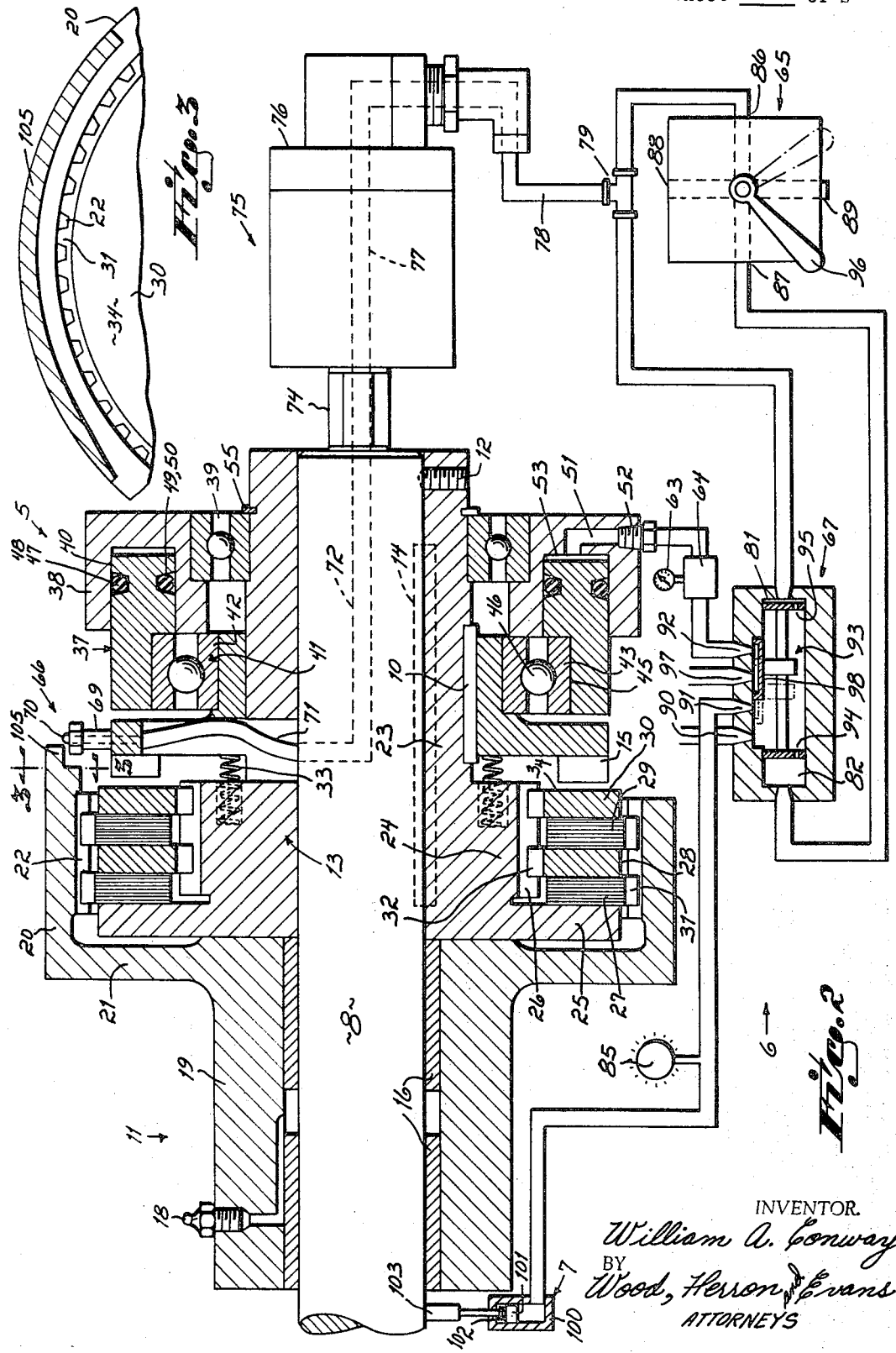

3,419,117
OVERLOAD RELEASED PNEUMATIC CLUTCH WITH BRAKE
William A. Conway, Cincinnati, Ohio, assignor to The Conway Clutch Company, Cincinnati, Ohio, a corporation of Ohio
Filed Nov. 2, 1966, Ser. No. 591,463
9 Claims. (Cl. 192—15)

ABSTRACT OF THE DISCLOSURE

A torque responsive pneumatic clutch and control system which comprises at least two friction discs drivingly connected to driven and driving members, and a pneumatic motor for moving the discs into and out of driving engagement. The control system includes a pressure relief valve mounted upon one of the driving or driven members and a cam for actuating the valve connected to the other member. In the event of relative slippage between the two discs and consequently the driving and driven member, the pressure relief valve is actuated and opened. Opening of the presure relief valve triggers a control system which then moves the discs out of driving engagement and moves the pressure relief valve out of alignment with the actuating cam.

---

This invention relates to pneumatic clutches and, more particularly, to a pneumatic clutch which is automatically responsive to detection of a control condition, such as a torque overload, to disengage the clutch.

Torque overload responsive clutches and clutch control systems have been known and used in industry prior to this invention. However, the only torque responsive clutch control systems which have met with commercial acceptance have either operated upon mechanical or electrical principles. To my knowledge, there have never been a commercially acceptable pneumatic clutch and clutch control system which responded automatically to a control condition, such as position or torque overload.

There have been prior attempts to produce torque responsive pneumatic clutch and clutch control systems. However, all of these prior attempts have failed to produce an acceptable general purpose, torque overload, pneumatic clutch for the same reason. In each instance the structure was so complex and included so many moving parts that it was too expensive to manufacture for general and widespread application and it was subject to unacceptable breakdown frequencies.

Therefore, the primary objective of this invention has been to provide a relatively simple and inexpensive pneumatic clutch and clutch control system which is automatically responsive to a control condition, such as a torque overload, to decommission the clutch.

Another objective of this invention has been to provide a relatively simple and inexpensive, purely pneumatic clutch and clutch control system which is automatically responsive to the position of the clutch or clutch driven member for decommissioning the clutch.

Briefly, the clutch and control system of this invention comprises a pneumatically actuated clutch having driving and driven sections interconnected by facially juxtapositioned friction discs. Axial movement of the friction discs into and out of facial engagement controls interengagement of the two sections of the clutch. This axial movement is in turn controlled by a pneumatic motor mounted upon one of the sections. Actuation of the pneumatic motor is controlled either manually from a manual air valve connected to the motor through a conventional four-way control or spool valve, or automatically, by a pressure relief valve operable when actuated to reposition the spool of the control valve and thus reposition the motor so as to disengage the clutch.

In one preferred embodiment in which the clutch is responsive to torque overload on the driven member, the pressure relief valve is located on either the driving or driven section of the clutch and a relief valve actuator or cam is located on the other section. Upon rotational slippage of the friction discs relative to each other when the clutch is engaged, the cam is operable to actuate the pressure relief valve, opening it so as to effect a repositioning of the spool of the control valve and a disconnection of the air pressures to the clutch motor so that the friction discs are moved out of driving engagement. The air pressure which has been disconnected from the clutch motor may be used to actuate a brake or it may be used to actuate a signalling system or simply exhausted.

In installations in which the clutch and control system are used for automatic position control, the pressure relief valve is positioned relative to an element which is driven by the clutch as to be opened when the driven element is in a preselected position. Opening of the pressure relief valve effects repositioning of the spool of the control valve so as to reposition the pneumatic motor of the clutch and disengage the friction discs of the clutch.

The primary advantage of this clutch control system is that it provides a very simple, inexpensive and highly practical pneumatic clutch and clutch control system. It thus fills a void and supplies a demand which has heretofore existed for a commercially acceptable, purely pneumatic, torque or position responsive clutch.

These and other objects and advantages of this invention will be more readily apparent from the following description of the drawings in which:

FIG. 1 is a perspective view of the clutch and clutch control system of this invention, FIG. 2 is a partially diagrammatic view of the control system with the clutch and main control valve shown in cross section, FIG. 3 is a cross sectional view of a portion of the clutch taken along line 3—3 of FIG. 2.

Referring first to FIGURE 1, there is illustrated one preferred embodiment of the pneumatic clutch 5 and clutch control system 6 of this invention. In this embodiment, the control system 6 also controls a pneumatic brake 7, mounted in juxtaposition to the clutch 5 on a common shaft 8. The brake per se forms no part of this invention except in combination with the novel clutch and control system which has been illustrated and described herein.

As may best be seen in FIGURE 2, the clutch 5 comprises a driving sleeve 11 and driven sleeve 13, the driving sleeve 11 being rotatably journaled upon the shaft 8 and the driven sleeve 13 being drivingly connected to the shaft 8 by a key 14 and secured thereon by a set screw 12. Bushings 16 are preferably located between the driving sleeve 11 and the shaft 8 to reduce friction between the two. Lubricant may be supplied to the bushings 16 from a grease fitting 18.

The driving sleeve 11 may be driven from any power source, as for example a belt and pulley 17 which may be secured to the periphery of the sleeve, as shown in FIGURE 1. A radial flange 21 extends outwardly from a hub section 19 of the sleeve 11 and interconnects the hub to an internally geared or splined ring section 20 having longitudinally extending gear teeth or splines 22.

The driven sleeve 13 comprises a small diameter hub section 23, a large diameter externally geared section 24, and a still larger diameter radial flange 25. The intermediate geared section 24 has peripheral teeth or splines 26 located in the same radial plane as the internal teeth or splines 22 of the driving sleeve 11.

Friction discs or driving plates 27, 28, 29, and 30 interconnect the driving and driven sleeves 11 and 13. Alternate ones 27, 29 of the discs have external teeth or grooves 31 in driving engagement with the internal gear teeth 22 of the driving sleeve 11 while the two other discs 28, 30 have internal teeth or grooves 32 in driving engagement with the external teeth or splines 26 of the driven sleeve 13. All of the friction discs are located in facial juxtaposition with one of the discs 27 abutting against the radial flange 25 of the driven sleeve 13 so that frictional drive may be imparted through the discs 27–30 to the flange 25 and thus to the driven sleeve 13.

Normally, or when the clutch is disengaged, the friction discs 27–30 reside in loose facial engagement. To move the discs axially into driving engagement, a pressure plate 15 is engageable with the disc 30 to move it toward the flange 25 of the driving sleeve. The pressure plate 15 surrounds and is drivingly connected to the hub 23 of the driven sleeve 13 by a key 10. A plurality of compression springs 33 are located between the pressure plate 15 and the driven sleeve 13 and function to bias the plate 15 away from the friction discs and away from contacting relationship with the radial face 34 of the friction disc 30.

Axial movement of the pressure plate 15 is controlled by an annular shaped piston 37 mounted within a housing 38 which surrounds the hub 23 of the driven sleeve 13. A ball bearing 39 separates and supports the non-rotatable housing 38 upon the rotatable hub 23. The bearing 39 is secured against axial movement on the hub 23 by a snap ring 55.

The piston 37, which is axially movable within an annular bore or groove 40 of the housing 38 is connected to the pressure plate 15 by a ball bearing 41. The inner race 42 of the bearing 41 is seated upon and rotatable with the pressure plate 15 while the outer race 43 is non-rotatably seated within a groove or recess 45 of the piston 37. Thus the inner race may rotate with the pressure plate while the outer race remains secured against rotation within the piston, the rotation occuring in the balls 46 of the bearing 41 which rotate freely within the grooves or raceways of the internal and external races 42, 43.

A pair of O-rings 47, 49 seal the rear of the groove 40 and the piston 37 so that a pressure chamber 53 is defined between the rear of the piston and the inner portion of the groove 40. One O-ring 47 is seated within a groove 48 around the periphery of the piston and the O-ring 49 is seated within a groove 50 which extends around the inside of the piston.

A bore 51 in the housing 38 connects the chamber 53 at the rear of the groove 40 with a pressure intake port 52 such that air under pressure may be supplied to the chamber 53 to effect axial movement of the piston 37. When the piston 37 is moved forwardly it moves with it the bearing 41 and the connected pressure plate 15. When air under pressure is exhausted from the chamber 53, the springs 33 force the pressure plate 15 rearwardly away from the friction disc 30.

The clutch control system 6, except for a pressure relief valve 66 mounted upon the clutch and the interconnecting air hoses, is completely housed within a housing 80 (FIGURE 1) remote from the clutch. Specifically, a main control valve 67, a manual control valve 65, a pressure regulator valve 64 and a torque setting gauge 63 are mounted within this housing 80. From this remote control station, the clutch 5 may be engaged or disengaged by manual movement of a handle 96 of the manual control valve 65, and the torque level at which the clutch will automatically disengage, may be set by moving the control knob 68 of the pressure regulator valve 64 to effect a change of the air pressure supplied to the clutch piston chamber 53.

The pressure relief valve 66, which controls automatic disengagement of the clutch 5 when a preset torque level is exceeded, is mounted directly upon the pressure plate 15 and extends radially from it. It comprises a cylinder or sleeve 69 within which a plunger 70 is movable to control opening and closing of the valve 66. The plunger 70 normally extends beyond the end of the cylinder 69 at which time it is in sealing engagement with the cylinder. When it is forced inwardly against a spring bias, the seal in broken and the valve opened. This pressure relief valve has not been shown in detail since it is a well known commercial product and operates in the same manner as a conventional automobile or bicycle tire valve.

The interior of the pressure relief valve 66 is connected to one end chamber 81 of the main control valve 67 by a hose 71, a conduit 72, a rotary union 75, a hose 78, and a T-joint 79. The flexible conduit or hose 71 is connected to the channel 72 which extends through the interior of the shaft 8, and in turn is connected to the conventional rotary union 75. This union 75 has one end section 74 which is rotatable relative to the opposite non-rotatable end 76. A conduit 77 extends through the interior of the union and is connected by the hose 78 to the T-joint 79 which is mounted on the end of the main control valve 67 (see FIGURE 1) and is open to the end chamber 81 of the main control valve 67. For clarity of the drawings, the T-joint 79 has been shown as being remote from the valve 67 in FIGURE 2. In addition to connecting the relief valve 66 to the end chamber 81 of the main control valve 67, the T-joint also is connected to the manual control valve 65 so that the end chamber 81 of the main control valve 67 may be exhausted through either the pressure relief valve 66 or the manual control valve 65, as is explained more fully hereinafter.

The manual control valve 65 functions to manually effect engagement and disengagement of the clutch 5. It consists of a conventional four-way lever operated valve having a spring return to neutral. One intake port 86 of this valve is connected to the end chamber 81 of the main control valve 67 and another intake port 87 is connected to the opposite end chamber 82 of the main valve 67. The manual valve has two exhaust ports 88, 89, one, 89, of which is plugged.

Whenever the handle 96 of the valve 65 is moved toward either of the ports 86, 87 it functions to connect the particular port toward which it is moved to exhaust. One valve which has been found to be particularly suitable for this application is a Nopak four-way lever operated valve. This valve is manufactured by the Nopak Division of the Galland-Henning Manufacturing Company.

The main control valve 67 is a conventional four-way spool valve which is commercially available and therefore has only been illustrated diagrammatically. One such valve which has been found to be particularly suitable for this application is a Nopak "VR" valve manufactured by the Nopak Division of the Galland-Henning Manufacturing Company. This valve utilizes impalance on the ends of the spool 93 to effect spool movement. It has an air supply pressure inlet 90 selectively connectable to either a brake outlet 91 or a clutch outlet 92. The pressure inlet 90 is always connected to both ends of the spool 93 via conduits 94, 95 which extend through the spool. The conduits interconnect the chambers 81, 82 at the ends of the spool with the pressurized open center portion of the valve.

The spool 93 of this valve is movable between two positions, in one of which it is located at the right end of the valve cylinder as viewed in FIGURE 2 and connects the clutch control port 92 of the valve 67 to an exhaust port 97. In the other position in which it is located at the left end of the cylinder, the spool connects the exhaust port 97 to the brake control port 91. When the clutch control port 92 is open to the air supply port 90, the brake port 91 is connected to the exhaust port 97 by a port cover 98 attached to the spool, and when the brake port is open or uncovered, the clutch port is open to exhaust through the cover 98. The pressure inlet of this valve is never closed so that high pressure air is always maintained on the interior of the valve and is available and connected to the opposite end chambers 81, 82 of the valve through the spool conduits 94, 95.

The end chambers 81, 82 of the main control valve 67 are of the same diameter so that the force applied to the opposite ends of the spool is balanced unless or until one of the end chambers is connected to exhaust by either the manual control valve 65 or by the pressure relief valve 66. When the handle 96 of the manual control valve 65 is moved to the left and so long as it is held to the left as viewed in FIGURE 2, it connects the intake port 86 of the valve 65 to the exhaust port 88 and thereby connects the chamber 81 at the right end of the spool of the main control valve 67 to exhaust. When the handle 96 is moved to the right, the opposite end of the spool is connected to exhaust so that the spool is caused to be moved to the right.

In the preferred embodiment, the port 91 has been illustrated as connected to the pneuematic brake 7. It could as well, however, be connected to a pneumatic signalling light or it could be simply used as an exhaust port.

The brake 7 per se forms no part of this invention independently of the control system and has therefore only illustrated diagrammatically in FIGURE 2. Preferably the brake is pneumatically actuated and comprises a cylinder 100 within which a piston 101 is movable to locate a brakeshoe 103 in engagement with the shaft 8. When the pressure source is disconnected from the cylinder 100 (by moving the spool 93 to the left as viewed in FIGURE 2), the brake port 91 of the valve 67 is connected to the exhaust port 97 and the brakeshoe 103 is moved out of engagement with the shaft 8 under the bias of the spring 102.

To effect engagement of the clutch, the handle 96 is moved to the right as viewed in FIGURE 2, so as to connect the intake port 86 of the manual control valve to the exhaust port 88, thereby connecting the chamber 82 at the left end of the spool of the main control valve 67 to exhaust. This effects an imbalance in the pressure at the ends of the spool so that the spool is caused to be moved to the left and thereby uncovers the clutch control port 92 of the valve which is then connected to the pressure port 90. When the handle 96 is released, it returns to its centered position in which neither of the manual control valve ports 86, 87 is connected to exhaust but the main control valve spool 93 remains in the position to which it was moved because of the balance of pressure at the opposite ends of the spools.

When pressurized air at a pressure above that of the atmosphere is supplied to the piston chamber 53 of the clutch, it causes the piston 37 to move to the left so as to move pressure plate 15 into engagement with the friction or drive plate 30 of the clutch. When the pressure plate is moved all the way to the left as viewed in FIGURE 2, the clutch is engaged and the plunger of the pressure relief valve 66 is located in the path of movement of a cam 105 attached to the driving sleeve 11. Should the friction plates slip or slide relative to each other when the clutch is in driving engagement, the plunger 70 will be rotated from beneath the cam surface 105, causing the valve 66 to open with the result that the right end chamber 81 of the main control valve will be connected to exhaust through the valve 66. This results in the spool 93 of the main control valve 67 being moved to the right so that the clutch control port 92 of the valve 67 is connected to the exhaust port 97 through the cover 98, and the brake control port 91 is uncovered or connected to the pressure port 90 through the interior of the valve 67. This results in the clutch being disengaged and the brake applied.

If, when the clutch is to be engaged, by manually moving the handle 96 to the right, the pressure relief valve 66 is axially aligned with the cam surface 105, the relief valve 66 will open so that the clutch will not be engaged until the driving sleeve 11 has rotated to a position in which the relief valve 66 and the cam 105 are out of alignment.

While this invention has been described in the preferred embodiment as applied to a torque responsive clutch, it could as well be used in a position response clutch. If used in this latter fashion, the relief valve 66 would be positioned in a contacting position with respect to an element driven by the clutch so that the driven element would contact and open the relief valve 66 when in a predetermined or preselected position.

While only a single preferred embodiment of this invention has been illustrated and specifically described herein, those skilled in the art to which this invention pertains will readily appreciate numerous changes and modifications which may be made without departing from the spirit or scope of the invention. Having described my invention, I claim:

1. A torque responsive control system comprising:
a pneumatic clutch having a rotatable driving member and a rotatable driven member, a first friction disc drivingly connected to said driving member, a second friction disc drivingly connected to said driven member, a pneumatic motor including a piston and cylinder operatively associated with said friction discs for controlling movement of said discs into and out of frictional driving engagement, a pressure relief valve drivingly connected to one of said members, said pressure relief valve being normally spring biased to a closed position, a pressure relief valve actuator drivingly connected to the other of said members, said actuator being engageable with said relief valve to open said valve against said spring bias upon relative rotational movement of said drivingly and driven members when said discs are in driving engagement,
a pneumatic control valve operable to control connection of said pneumatic motor with a source of air pressure, and
control means including said pneumatic control valve, said pneumatic motor, and said pressure relief valve for moving said friction discs out of driving engagement in response to opening of said pressure relief valve as a consequence of torque overload on said driven member,
said pressure relief valve being returned to its normally closed position in response to disengagement of said friction discs so that said pressure relief valve is automatically repositioned for the next clutch cycle.

2. A torque responsive control system comprising:
a pneumatic clutch having a rotatable driving member and a rotatable driven member, a first friction disc drivingly connected to said driving member, a second friction disc drivingly connected to said driven member, a pneumatic motor including a piston and cylinder operatively associated with said friction discs for controlling movement of said discs into and out of frictional driving engagement, a pressure relief valve drivingly connected to one of said members, a pressure relief valve actuator drivingly connected to the other of said members, said actuator being engageable with said relief valve to open said valve upon relative rotational movement of said driving and driven members when said discs are in driving engagement,
a pneumatic brake,
a pneumatic control valve operable to control connection of said pneumatic motor with a source of air pressure, and
control means including said pneumatic control valve, said pneumatic motor, and said pressure relief valve for moving said friction discs out of driving engagement and for applying said pneumatic brake in response to opening of said pressure relief valve as a consequence of torque overload on said driven member.

3. A torque responsive control system comprising:
a pneumatic clutch having a rotatable driving member and a rotatable driven member, a first friction disc drivingly connected to said driving member, a second friction disc drivingly connected to said driven member, a pneumatic motor including a piston and cylinder operatively associated with said friction discs for controlling movement of said discs into and out of frictional driving engagement, a pressure relief valve drivingly connected to one of said members, a pressure relief valve actuator drivingly connected to the other of said members, said actuator being engageable with said relief valve to open said valve upon relative rotational movement of said driving and driven members when said discs are in driving engagement, a pneumatic control valve operable to control connection of said pneumatic motor with a source of air pressure, said control valve comprising a spool valve having a cylinder within which a spool is movable, said cylinder having a pressure inlet port connected to said air pressure source, a pressure exhaust port, and a pressure control port connected to the pneumatic motor of said clutch, said spool valve having a chamber at one end of said spool normally connected to said pressure source, a manual control valve connected to said chamber, said manual control valve being operable to selectively connect said chamber to exhaust and thereby effect movement of said spool in said cylinder, said chamber also being connected to said pressure relief valve whereby opening of said pressure relief valve connects said chamber to exhaust and thereby effects movement of said spool in said cylinder, and control means including said pneumatic control valve, said pneumatic motor, and said pressure relief valve for moving said friction discs out of driving engagement in response to opening of said pressure relief valve as a consequence of torque overload on said driven member.

4. The torque responsive control system of claim 3 wherein said spool valve has a second chamber at the opposite end of said spool normally connected to said pressure source, said second chamber also being connected to said manual control valve, said manual control valve being operable to selectively connect said second chamber to exhaust.

5. A torque responsive pneumatic control system comprising:
a pneumatic clutch having a driving member and a driven member, one of said members comprising a first sleeve rotatably mounted upon a shaft and the other member comprising a second sleeve drivably keyed to and mounted upon said shaft,
a first friction disc drivingly connected to said first sleeve,
a second friction disc drivingly connected to said second sleeve,
a pneumatic motor mounted upon one of said sleeves and including a piston and cylinder operatively associated with said first and second friction discs for controlling movement of said friction discs into and out of frictional driving engagement.
a pneumatic valve including an actuating plunger drivingly connected to one of said sleeves, said plunger being spring biased to a closed position,
a cam drivingly connected to the other of said sleeves, said cam being located in the path of movement of said valve plunger when said first and second friction discs are in driving engagement, said cam being operative to engage said plunger and effect opening of said valve to exhaust in response to relative movement between said driving and driven members when said first and second friction discs are in driving engagement, and
control means including said pneumatic motor for moving said friction discs out of driving engagement in response to opening of said pneumatic vale as a consequence of torque overload on said driven member, and
said pressure relief valve being returned to its normally closed position in response to disengagement of said friction discs so that said pressure relief valve is automatically repositioned for the next clutch cycle.

6. The torque responsive pneumatic control system of claim 5 wherein said control means includes a pressure regulator operative to control the torque setting at which the overload condition occurs.

7. A torque responsive clutch comprising:
a driving member and driven member, one of said members comprising a first sleeve adapted to be drivingly keyed to a shaft, the other of said members comprising a second sleeve adapted to be rotatably received upon the same shaft in axially offset relation to said first sleeve, one of said sleeves having external splines located in a common radial plane with internal splines of the other sleeve, said external splines being radially spaced inwardly from said internal splines,
at least one friction disc having peripheral grooves mating wtih said internal splines and at least one other friction disc having internal grooves mating with said external splines, said friction discs having complementary radial surfaces adapted to be placed in fractional driving engagement so as to effect a driving and driven relationship between said first and second sleeve,
a pressure relief valve mounted upon one of said sleeves, said valve having a pressure relief plunger,
a cam mounted upon the other of said sleeves, said cam being located in the path of movement of said valve plunger when said discs are in driving engagement and being located out of the path of movement of said plunger when said discs are out of driving engagement,
a piston supporting ring mounted upon one of said sleeves, said ring being rotatable relative to the sleeve upon which it is mounted,
at least one axially movable piston mounted within said cylinder, said piston being movable between one position in which it forces said discs into driving engagement and another position in which it releases said discs from driving engagement, said piston also being operable to effect relative axial movement between said relief valve and said cam so as to locate said cam in the path of movement of said plunger when said discs are in driving engagement and to locate said cam out of the path of movement of said plunger when said discs are out of driving engagement.

8. A condition responsive control system comprising:
a pneumatic clutch having a rotatable driving section and a rotatable driven section, a first friction disc drivingly connected to said driving section, a second friction disc drivingly connected to said driven section, a pneumatic motor including a piston and cylinder operably associated with said friction discs for controlling movement of said discs into and out of frictional driving engagement,
a pressure relief valve member and a pressure relief valve actuator member, at least one of said members being movable when said clutch is engaged.
a pneumatic control valve including a cylinder within which a spool is movable, said cylinder having a pressure inlet port connected to an air pressure source, a pressure exhaust port, and a pressure control port connected to the pneumatic motor of said clutch, said control valve having a chamber at one end of said spool normally connected to said pressure source,
a manual control valve connected to said chamber of said control valve, said manual control valve being operable to selectively connect said chamber to exhaust and thereby effect movement of said spool in said cylinder, said chamber of said control valve also being connected to said pressure relief valve whereby opening of said pressure relief valve connects said chamber to exhaust and thereby effects movement of said spool in said cylinder.

9. The condition responsive control system of claim 8 whereby said control valve has a second chamber at the opposite end of said spool normally connected to said pressure source, said second chamber also being connected to said manual control valve such that said manual control valve is selectively operable to connect said second chamber to exhaust.

References Cited

UNITED STATES PATENTS

| 2,642,971 | 6/1953 | Hagenbook | 192—56 |
| 3,065,832 | 11/1962 | Bucknell | 192—85 |
| 3,298,488 | 1/1967 | McDonald | 192—56 |

FOREIGN PATENTS

| 721,279 | 1/1955 | Great Britain. |
| 521,399 | 3/1931 | Germany. |

BENJAMIN W. WYCHE III, *Primary Examiner.*

U.S. Cl. X.R.

192—17, 56, 85

UNITED STATES PATENT OFFICE
CERTIFICATE OF CORRECTION

Patent No. 3,419,117                                                                  December 31, 1

William A. Conway

It is certified that error appears in the above identified patent and that said Letters Patent are hereby corrected as shown below:

Column 1, line 37, "there have never" should read -- there has never --. Column 2, line 12, "air pressures to" should read -- air pressure to --. Column 4, line 52, "utilizes impalance on" should read -- utilizes imbalance on --. Column 5, lines 20 and 21, "only illustrated" should read -- only bee illustrated --. Column 6, lines 29 and 30, "said drivingly and" should read -- said driving and --. Column 7, line 60, "engagement." should read -- engagement, --; line 75, "pneumatic vale as" should read -- pneumatic valve as --. Column 8, line 24, "mating wtih said" should read -- mating with said --; line 28, "in fractional driving" should read -- in frictional driving --; line 65, "engaged." should read -- engaged, --.

Signed and sealed this 17th day of March 1970.

(SEAL)

Attest:

Edward M. Fletcher, Jr.                            WILLIAM E. SCHUYLER, JR.

Attesting Officer                                               Commissioner of Patents